US010982928B2

(12) United States Patent
Fiester et al.

(10) Patent No.: US 10,982,928 B2
(45) Date of Patent: *Apr. 20, 2021

(54) FIREARM BARREL TRAY, STOCK, AND RELATED METHODS

(71) Applicant: Magpul Industries Corp., Austin, TX (US)

(72) Inventors: Jeremy M. Fiester, Lafayette, CO (US); Grady Barfoot, Denver, CO (US); Michael T. Mayberry, Denver, CO (US)

(73) Assignee: Magpul Industries Corp., Austin, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/419,311

(22) Filed: May 22, 2019

(65) Prior Publication Data

US 2019/0301832 A1 Oct. 3, 2019

Related U.S. Application Data

(63) Continuation of application No. 15/914,879, filed on Mar. 7, 2018, now Pat. No. 10,345,076.

(60) Provisional application No. 62/468,080, filed on Mar. 7, 2017.

(51) Int. Cl.
| *F41C 27/00* | (2006.01) |
| *F41C 23/16* | (2006.01) |
| *F41G 11/00* | (2006.01) |
| *F41C 23/20* | (2006.01) |
| *B29L 31/00* | (2006.01) |

(52) U.S. Cl.
CPC .............. *F41C 27/00* (2013.01); *F41C 23/16* (2013.01); *F41C 23/20* (2013.01); *F41G 11/001* (2013.01); *B29L 2031/777* (2013.01)

(58) Field of Classification Search
CPC ...... F41A 21/48; F41A 21/484; F41A 21/485; F41A 21/487; F41C 27/00; F41C 23/16; F41C 23/20; F41G 11/001
USPC .......................... 42/75.01, 75.02, 75.03, 124
See application file for complete search history.

(56) References Cited

U.S. PATENT DOCUMENTS

| 1,173,582 A | 2/1916 | Johnson |
| 1,370,118 A | 3/1921 | Johnson |
| 1,760,731 A | 5/1930 | Williams |

(Continued)

FOREIGN PATENT DOCUMENTS

| CA | 2617094 A1 | 2/2007 |
| EP | 0903556 A1 | 3/1999 |

(Continued)

OTHER PUBLICATIONS

Gruber, Stephen, "Response to Office Action Regarding U.S. Appl. No. 15/914,879", dated Jan. 17, 2019, p. 8, Published in: US.

(Continued)

*Primary Examiner* — Joshua E Freeman
(74) *Attorney, Agent, or Firm* — Neugeboren O'Dowd PC

(57) ABSTRACT

A firearm barrel tray having a barrel channel and a firearm accessory mounting interface, wherein the firearm barrel tray is configured to be attached to a firearm stock such that the barrel channel sits on a first side of the firearm stock and the firearm accessory mounting interface is configured to align with a recess on a second side of the firearm stock.

14 Claims, 19 Drawing Sheets

(56) References Cited

U.S. PATENT DOCUMENTS

| | | | |
|---|---|---|---|
| 2,529,733 A | 11/1950 | King | |
| 2,589,912 A | 3/1952 | Weld | |
| 2,717,465 A * | 9/1955 | Clark, Jr. | F41C 23/00 42/75.01 |
| 2,967,368 A | 1/1961 | Williams | |
| 3,011,283 A | 12/1961 | Lunn et al. | |
| 3,060,612 A | 10/1962 | Brown et al. | |
| 3,611,611 A | 10/1971 | Quinney | |
| 3,830,003 A | 8/1974 | Clerke | |
| 3,842,527 A | 10/1974 | Low | |
| 4,220,071 A | 9/1980 | Seiderman | |
| 4,297,801 A | 11/1981 | Kahn | |
| 4,385,464 A | 5/1983 | Casull | |
| 4,519,156 A | 5/1985 | Shaw | |
| 4,608,909 A | 9/1986 | Peters | |
| 4,644,930 A | 2/1987 | Mainhardt | |
| 4,674,216 A | 6/1987 | Ruger et al. | |
| D297,855 S | 9/1988 | Ruger et al. | |
| 4,864,761 A | 9/1989 | Gregory | |
| D304,223 S | 10/1989 | Ruger et al. | |
| 4,989,359 A | 2/1991 | Kinkner et al. | |
| 5,228,887 A | 7/1993 | Mayer | |
| 5,279,200 A | 1/1994 | Rose | |
| 5,410,834 A | 5/1995 | Benton et al. | |
| 5,423,145 A | 6/1995 | Nasset | |
| 5,540,008 A | 7/1996 | Kimstatter | |
| 5,544,564 A | 8/1996 | Balbo et al. | |
| RE35,381 E | 11/1996 | Rose | |
| 5,669,169 A | 9/1997 | Schmitter et al. | |
| 5,678,343 A | 10/1997 | Menges et al. | |
| 5,706,599 A | 1/1998 | Knight | |
| 5,987,797 A | 11/1999 | Dustin | |
| 6,070,354 A | 6/2000 | Burigana et al. | |
| 6,205,696 B1 | 3/2001 | Bilgeri | |
| 6,223,458 B1 | 5/2001 | Schwinkendorf et al. | |
| 6,295,751 B1 | 10/2001 | Piwonski | |
| 6,301,817 B1 | 10/2001 | Hogue et al. | |
| 6,427,372 B1 | 8/2002 | Howard et al. | |
| 6,637,142 B1 | 10/2003 | Reynolds | |
| 6,889,462 B1 | 5/2005 | Carlson | |
| 7,036,259 B2 | 5/2006 | Beretta | |
| 7,104,000 B2 | 9/2006 | Orth | |
| 7,137,219 B2 | 11/2006 | Wossner et al. | |
| 7,337,574 B2 | 3/2008 | Crandall et al. | |
| 7,451,564 B2 | 11/2008 | Wait | |
| 7,523,579 B2 | 4/2009 | Al-Mulla | |
| 7,587,853 B2 | 9/2009 | Aalto | |
| 7,631,453 B2 | 12/2009 | Longueira | |
| 7,694,449 B1 | 4/2010 | Pontillo | |
| D616,056 S | 5/2010 | Bentley | |
| 7,716,864 B2 | 5/2010 | Skrubis et al. | |
| 7,823,314 B1 | 11/2010 | Wheatley | |
| 7,841,121 B1 | 11/2010 | Barrett | |
| D631,526 S | 1/2011 | Torre et al. | |
| 7,861,640 B2 | 1/2011 | Lippard | |
| 7,886,473 B2 | 2/2011 | Rotharmel | |
| 7,954,270 B2 * | 6/2011 | Bentley | F41G 11/003 42/71.01 |
| 8,056,278 B2 | 11/2011 | Bentley | |
| 8,079,169 B2 | 12/2011 | Gregg | |
| 8,109,027 B2 | 2/2012 | Cragg | |
| 8,141,285 B2 | 3/2012 | Brown | |
| 8,176,671 B2 | 5/2012 | Pfersman et al. | |
| 8,220,194 B2 | 7/2012 | Crow | |
| 8,230,632 B2 | 7/2012 | Moretti | |
| 8,230,633 B1 * | 7/2012 | Sisk | F41A 21/485 42/75.01 |
| 8,234,808 B2 | 8/2012 | Lewis et al. | |
| D671,182 S | 11/2012 | Klotz | |
| D674,027 S | 1/2013 | Reinagel | |
| 8,341,863 B2 | 1/2013 | Kefer | |
| 8,353,123 B2 | 1/2013 | Pullicar et al. | |
| 8,397,415 B2 | 3/2013 | Laney et al. | |
| 8,397,416 B2 | 3/2013 | Laney et al. | |
| D679,356 S | 4/2013 | Klotz | |
| 8,464,628 B2 | 6/2013 | Potterfield et al. | |
| 8,522,468 B2 | 9/2013 | Webber et al. | |
| 8,528,243 B1 | 9/2013 | Glock | |
| 8,539,708 B2 | 9/2013 | Kenney et al. | |
| D692,514 S | 10/2013 | Vera et al. | |
| 8,561,335 B2 | 10/2013 | Brown | |
| D693,420 S | 11/2013 | Abbott et al. | |
| 8,601,736 B2 | 12/2013 | Andersson | |
| 8,615,915 B2 | 12/2013 | Hunter et al. | |
| D701,283 S | 3/2014 | Vera et al. | |
| 8,713,837 B2 | 5/2014 | Simpson | |
| 8,713,838 B2 | 5/2014 | Ubl et al. | |
| 8,714,144 B2 | 5/2014 | Zadra | |
| 8,782,940 B1 | 7/2014 | Morris | |
| 8,782,943 B2 | 7/2014 | Jarboe | |
| 8,806,789 B2 | 8/2014 | Devine | |
| D712,498 S | 9/2014 | Du Plooy | |
| D712,996 S | 9/2014 | Tresserras Torre | |
| 8,826,578 B2 | 9/2014 | Nogueira | |
| D717,386 S | 11/2014 | Moretti | |
| 8,881,444 B2 | 11/2014 | Warburton et al. | |
| 8,931,393 B1 | 1/2015 | Vincent et al. | |
| 8,984,790 B2 | 3/2015 | Wilson et al. | |
| 9,074,839 B2 | 7/2015 | Warburton | |
| 9,091,505 B1 | 7/2015 | Battaglia | |
| 9,140,506 B2 | 9/2015 | Gomez | |
| 9,140,519 B2 | 9/2015 | Simpson | |
| 9,151,553 B2 | 10/2015 | Constant et al. | |
| D744,055 S | 11/2015 | Bitz et al. | |
| D745,623 S | 12/2015 | Flores | |
| D745,940 S | 12/2015 | Flores | |
| 9,234,717 B2 | 1/2016 | Jarboe | |
| 9,273,926 B2 | 3/2016 | Wood et al. | |
| 9,285,178 B2 * | 3/2016 | Sellars | F41A 21/30 |
| 9,322,611 B1 * | 4/2016 | Barfoot | F41A 21/48 |
| D755,323 S | 5/2016 | Eitan et al. | |
| D757,885 S | 5/2016 | Barfoot et al. | |
| 9,429,387 B1 | 8/2016 | Barfoot et al. | |
| 9,448,034 B2 | 9/2016 | Downey et al. | |
| D781,391 S | 3/2017 | Findlay et al. | |
| 9,612,084 B2 | 4/2017 | Barfoot et al. | |
| D792,938 S | 7/2017 | Arnedo Vera et al. | |
| 9,857,132 B2 | 1/2018 | Ballard | |
| 10,094,639 B2 | 10/2018 | Sessions et al. | |
| 2005/0115135 A1 | 6/2005 | Thompson | |
| 2006/0162217 A1 | 7/2006 | Longueira | |
| 2007/0271833 A1 | 11/2007 | Fletcher | |
| 2008/0052977 A1 | 3/2008 | O'Dwyer et al. | |
| 2008/0244951 A1 | 10/2008 | Picard et al. | |
| 2011/0119982 A1 | 5/2011 | Webber et al. | |
| 2012/0042557 A1 | 2/2012 | Gomez et al. | |
| 2012/0180360 A1 | 7/2012 | Jones | |
| 2013/0232841 A1 | 9/2013 | Knoebel et al. | |
| 2014/0026460 A1 | 1/2014 | Warburton et al. | |
| 2014/0190055 A1 | 7/2014 | Warburton | |
| 2014/0190057 A1 | 7/2014 | Simpson | |
| 2014/0196342 A1 | 7/2014 | Syrengelas et al. | |
| 2015/0000171 A1 | 1/2015 | Roberts | |
| 2015/0007475 A1 | 1/2015 | Hasler | |
| 2015/0020423 A1 | 1/2015 | Withey | |
| 2015/0107144 A1 | 4/2015 | DiChario | |
| 2015/0192384 A1 | 7/2015 | Ballard | |
| 2015/0247695 A1 | 9/2015 | Jarboe | |
| 2015/0285583 A1 * | 10/2015 | Mayberry | F41C 23/16 42/71.01 |
| 2015/0316335 A1 | 11/2015 | Withey | |
| 2015/0377584 A1 | 12/2015 | Chvala | |
| 2016/0047623 A1 * | 2/2016 | Frankel | F41C 23/00 42/71.01 |
| 2016/0209155 A1 | 7/2016 | Dodson | |
| 2018/0003465 A1 | 1/2018 | Sessions et al. | |
| 2018/0128561 A1 | 5/2018 | Lesenfants | |
| 2018/0156555 A1 | 6/2018 | Sessions et al. | |
| 2018/0259293 A1 | 9/2018 | Fiester et al. | |

FOREIGN PATENT DOCUMENTS

| | | | |
|---|---|---|---|
| EP | 2017564 A2 | 1/2009 | |
| EP | 2641050 A1 | 9/2013 | |

(56) References Cited

FOREIGN PATENT DOCUMENTS

| | | |
|---|---|---|
| EP | 2791611 A1 | 10/2014 |
| EP | 2828604 A1 | 1/2015 |
| GB | 2485166 A | 5/2012 |
| WO | 2009097504 A1 | 8/2009 |

OTHER PUBLICATIONS

Freeman, Joshua, "Office Actioon Regarding U.S. Appl. No. 15/914,879", dated Nov. 30, 2018, p. 16, Published in: US.

Krynski, William, "International Search Report and Written Opinion re Application No. PCT/US16/18744", dated Apr. 21, 2016, p. 10, Published in: WO.

Amselle, Jorge, "5 Scout Rifles to Seriously Consider for Survival", "Retrieved from from https://gundigest.com/article/5-scout-rifles-survival", Dec. 19, 2017, p. 11, Published in: US.

Arsenal Inc. USA, "Arsenal Inc. USA Magazine Follower for 7.62 Magazines", "Known to exist as early as Apr. 2, 2015", Retrieved from http://ak-builder.com/index.php?dispatch=products.view&product_id=29988, p. 1, Published in: US.

Browning, "Boss Owner's Manual", "Retrieved from http://www.browning.com/content/dam/browning/support/owners-manuals/11-bfa-048-boss-om.pdf", Jan. 25, 2017, p. 9.

Magpul Industries, Corp., "Magpul Hunter 700", "Retrieved from https://www.magpul.com/products/hunter-700-stock-remington-700-short-action", Feb. 6, 2017, p. 9.

Magpul Industries, Corp., "Hunter X-22 Stock Ruger 10/22", "Retrieved from https://www.magpul.com/products/hunter-x-22-stock-ruger-10-22", Feb. 6, 2017, p. 9.

Magpul Industries, Corp., "SGA Stock Remington 870", "Retrieved from https://www.magpul.com/products/sga-stock-remington-870", Feb. 6, 2017, p. 8.

Magpul Industries, Corp., "X-22 Backpacker Stock Ruger 10/22 Takedown", "Retrieved from https://www.magpul.com/products/x-22-backpacker-stock-ruger-10-22-takedow", Feb. 6, 2017, p. 9.

TacStar, "TacStar Ruger 10-22 Adaptive Tactical Stock", "Webpage found at www.tacstar.com/home/tacticalstock.php", Known to exist as earl as Jul. 6, 2015 , p. 3, Published in: US.

Midway USA, "TacStar Stock M4 Tactical Collapsible Ruger 10/22 Synthetic", "Retrieved from http://www.midwayusa.com/product/1535931703/tacstar-stock-m4-tactical-collapsible-ruger-10-22-synthetic"p. 1, Published in: US.

Victor, Michael, "Victor Company Titan 1022 Forum", "Website located at http://www.rimfirecentral.com/forums/showpost.php?p=5128423&postcount=157", Apr. 20, 2016, p. 1.

altamontco.com, "Ruger 10/22 Advanced Hunting Stock", "Known to exist as early as May 22, 2018, https://www.altamontco.com/rifle-stocks/1022/kkc", p. 2, Published in: US.

Sturm, Ruger & Co., Inc., "Ruger 10/22 Autoloading Rifles", "Retrieved from http://www.ruger.com/products/1022/overview.html", Feb. 6, 2017, p. 4.

Rwal, "Spring Loaded Barrel Support", "Website located at http://www.rimfirecentral.com/forums/showthread.php?t=92703", Apr. 20, 2016, p. 4.

Michaud, Adriel, "Steyr Scout Review", "downloaded from https://www.huntinggearguy.com/rifle-reviews/steyr-scout-review/", Mar. 2, 2015, p. 14, Published in: US.

Stockys, LLC, "Stocky's New Long Range Composite Stock—Remington 700—Textured Finish", "Website located at https://www.stockysstocks.com/stocicy-s-new-long-range-composite-stock-remington-700-painted.html", Apr. 20, 2016, p. 3.

Lyman Products, "Tacstar—Adaptive Tactical 10-22 Stock", Sep. 30, 2013, "Retrieved from https://www.youtube.com/watch?v=ZfNOzG6FGRg", p. 4.

\* cited by examiner

US 10,982,928 B2

FIREARM BARREL TRAY, STOCK, AND RELATED METHODS

CLAIM OF PRIORITY UNDER 35 U.S.C. § 120

The present application for patent is a Continuation of patent application Ser. No. 15/914,879 entitled "FIREARM BARREL TRAY, STOCK, AND RELATED METHODS" filed Mar. 7, 2018, which claims priority to U.S. Provisional Application No. 62/468,080 filed on Mar. 7, 2017 and entitled "FIREARM BARREL TRAY, STOCK, AND RELATED METHODS," the entire disclosures of which are hereby incorporated by reference for all proper purposes.

FIELD

The present disclosure relates to firearms. In particular, but not by way of limitation, the present disclosure relates to systems and methods for supporting a rifle barrel.

BACKGROUND

Users of longarms often have a desire to attach accessories to them. There are several places on a rifle upon which accessories may be mounted, but some are most usefully mounted along the sides and bottom of the forend. Such accessories include slings, bipods, lights, alternate grips, lasers and other useful accessories.

There are existing mounting systems for various types of accessories; certain mounting systems are designed to work with accessories made by many different manufacturers. Some such mounting systems are designed to securely fasten accessories and provide a very low tolerance for movement, especially upon firing of the firearm itself. Such systems often work best with heavy, durable material to keep such movement tolerances low and for various other reasons. However, it is undesirable to use heavy, durable materials in some areas of a firearm, such as an entire stock, because such materials can increase the overall weight of the firearm. There remains a need for a lightweight firearm stock that provides a user with the ability to securely attach an accessory to a forward region of the firearm.

SUMMARY

In some examples, a firearm barrel tray, stock, and/or methods mount may be provided as claimed herein. An aspect of the disclosure provides a firearm barrel tray having a barrel channel and a firearm accessory mounting interface. The firearm barrel tray may be configured to be attached to a firearm stock such that the barrel channel sits on a first side of the firearm stock and the firearm accessory mounting interface may be configured to align with a recess on a second side of the firearm stock.

Another aspect of the disclosure provides a system having a firearm stock and a barrel tray removably coupled to the firearm stock. The barrel tray may comprise a barrel channel positioned on a first side of the firearm stock and a firearm accessory interface unitary with or directly coupled to the barrel channel. At least a portion of the accessory interface may be accessible from a second side of the stock, the second side opposing the first side. The barrel tray may be made of a stronger material than a material from which the firearm stock is made.

Yet another aspect of the disclosure provides a method of making a firearm support system. The method may comprise forming a firearm barrel channel and a firearm accessory interface from a first high-strength material, forming a stock from a second lower-strength material, and coupling the firearm barrel channel and firearm accessory interface to an interior portion of the firearm stock such that the firearm barrel channel sits on a first side of the stock and the firearm accessory interface is accessible from a second side of the stock.

Another aspect of the disclosure provides a system comprising a firearm stock and an accessory mounting interface. The accessory mounting interface may comprise one or more elongated slots and may be removably coupled to an interior portion of the firearm stock through a first side of the firearm stock and the one or more elongated slots may be accessible through a second side of the firearm stock. The accessory mounting interface may be made from a stronger material than a material from which the firearm stock is made.

DETAILED DESCRIPTION

Figure 1:
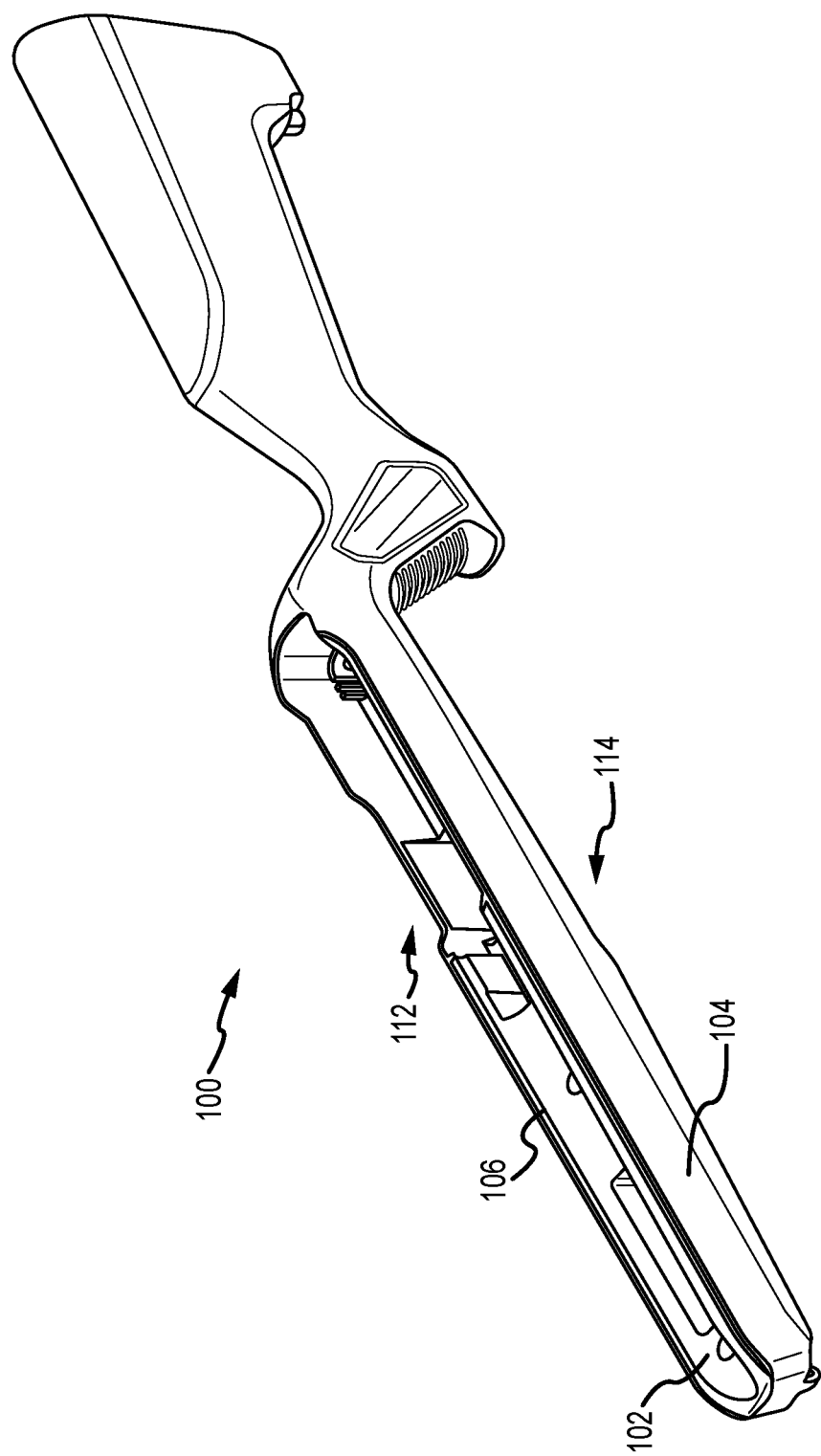
FIG. 1 is a top perspective view of a system for a firearm barrel tray and stock.
Figure 2:
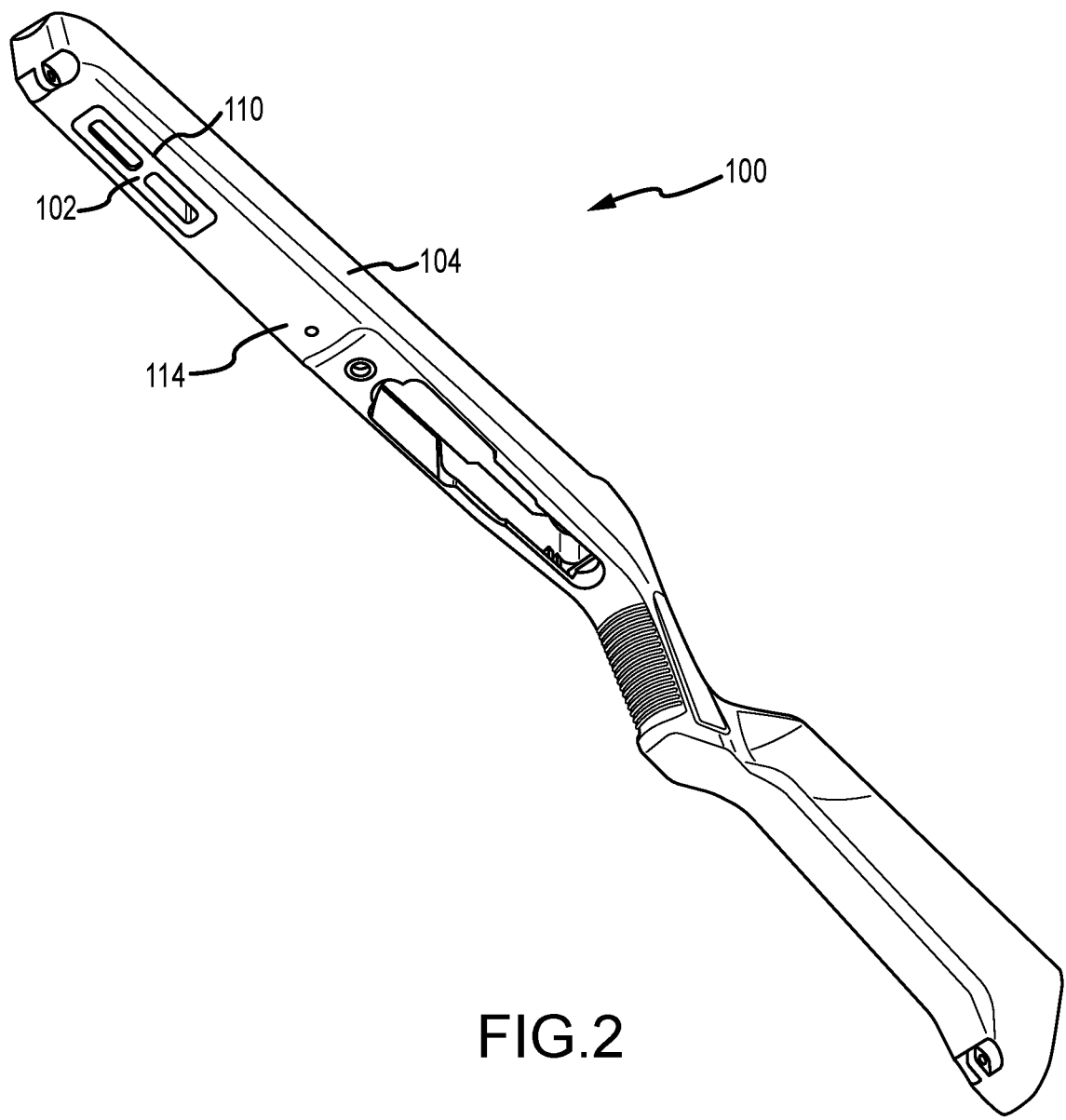
FIG. 2 is a bottom perspective view of the system in FIG. 1 illustrating accessory mounting points.

With reference to the figures an exemplary firearm barrel tray and stock as described herein are provided to give a user the option of mounting an accessory proximal to the forend of a stock or firearm, while at the same time minimizing the weight and/or costs of providing the system. For example, a firearm stock system 100 as illustrated in FIG. 1 may include a firearm barrel tray 102 (which may be referred to herein as simply "tray" 102) and a stock 104. The stock 104 may be a stock for a hunting rifle, and may itself be an original equipment manufacturer (OEM)-supplied stock, or may be used to replace an OEM hunting rifle stock. The tray 102 may be removably coupled to or adjacent a first side of the stock 104. The tray 102 may be attached such that a barrel channel 106 (see e.g. FIG. 3) is positioned adjacent the first side 112 of the stock 104 or system 100 and an accessory interface 108 protrudes at least partially through a recess 110 or passage in the stock 104 (as shown in FIG. 2) such that a user may mount an accessory (not illustrated) directly to the tray 102 from a second side 114 of the stock.

The tray 102 may be made primarily of a high-strength engineering grade polymer and/or reinforced composite materials in embodiments. It may also be made of other high-strength, durable, rigid, wear-resistant materials, such as metal or metal alloys. The rigidity and strength desired for mounting firearm accessories leads many manufacturers in the industry to use comparatively heavier and more expensive materials such as steel, aluminum or reinforced engineering polymers in some applications. This rigidity is most critical for accessories such as various sights (optical, lasers, iron, etc.) where any shift in the mounting would directly cause the point of aim to shift. Rigidity is also important for items such as bipods, grips or other items which ideally have no flex or movement where such shifts can indirectly affect point of aim.

Certain modular locking accessory mounting systems in the industry, such as the M-LOK® designed by Magpul® Inc., specifically benefit from a strong material durable enough to prevent damage to the mounting slot when engaging (i.e., turning and seating) the nut. Co-owned U.S. Pat. Nos. 8,925,236, 9,239,209, 9,239,210, 9,523,554, and 9,429,388 and U.S. patent application Ser. No. 15/357,216 for such a modular locking accessory mounting interface system are incorporated herein by reference. Strength is also needed to withstand the force often applied to the various accessories either intentionally (such as loading a bipod or sling to stabilize the gun) or inadvertently (such as accidental drops or impacts).

The stock 104 may be made of a lower-cost engineering polymer or a commodity plastic. The tray 102 may be made of a material that has a strength, rigidity, and/or weight that is greater than a strength, rigidity, and/or weight of the stock 104. The tray 102 may be shaped so as to resist deformation to a greater degree than does the stock 104. In some embodiments, the tray 102 may be made from a material that is 40-50% more dense than the material used to form the stock 104. In some embodiments, the tray 102 or any portion thereof used to form an accessory mounting interface 108 may be made from a material that is anywhere from 2-8 times heavier, 2-25 times stronger, and 10-30 times as stiff as a material used to form another part of the tray 102 or the stock 104. The ranges described herein are exemplary only, and other suitable ranges may be used.

Figure 3:
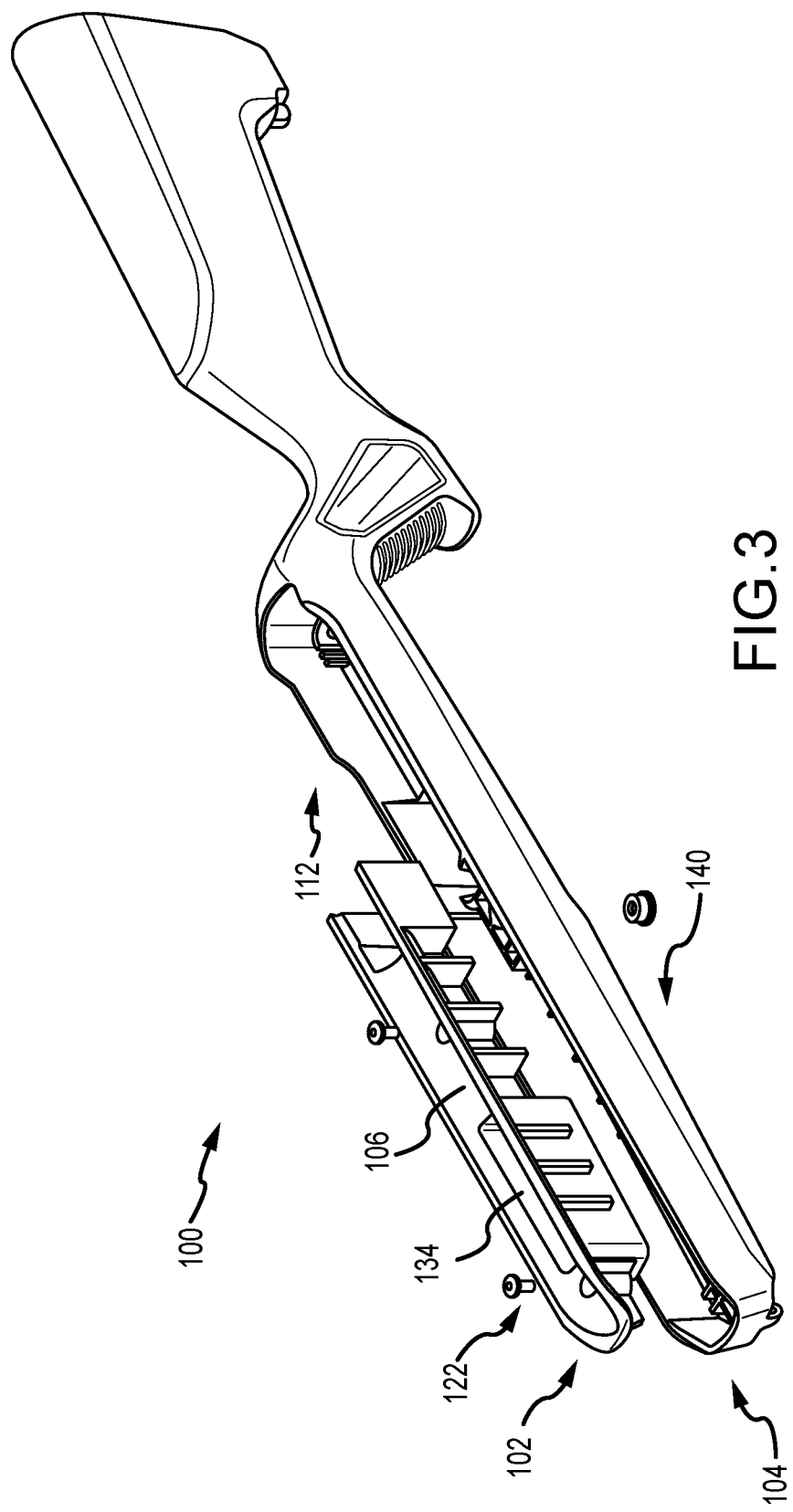
FIG. 3 is a perspective exploded view of the firearm barrel tray, stock, and attachment mechanism components of the system in FIG. 1.

FIG. 3 shows that the tray 102 may have a barrel channel 106 unitary with or directly coupled to an accessory interface 108. As shown, the barrel channel 106 may be configured to receive and interface with a barrel. The barrel channel 106 may include one or more cutouts 134 which create a space that allows air to flow out through elongated slots 116 of the accessory mounting interface. The cutout design 132 may also reduce an overall weight of the tray 102.

Figure 4:
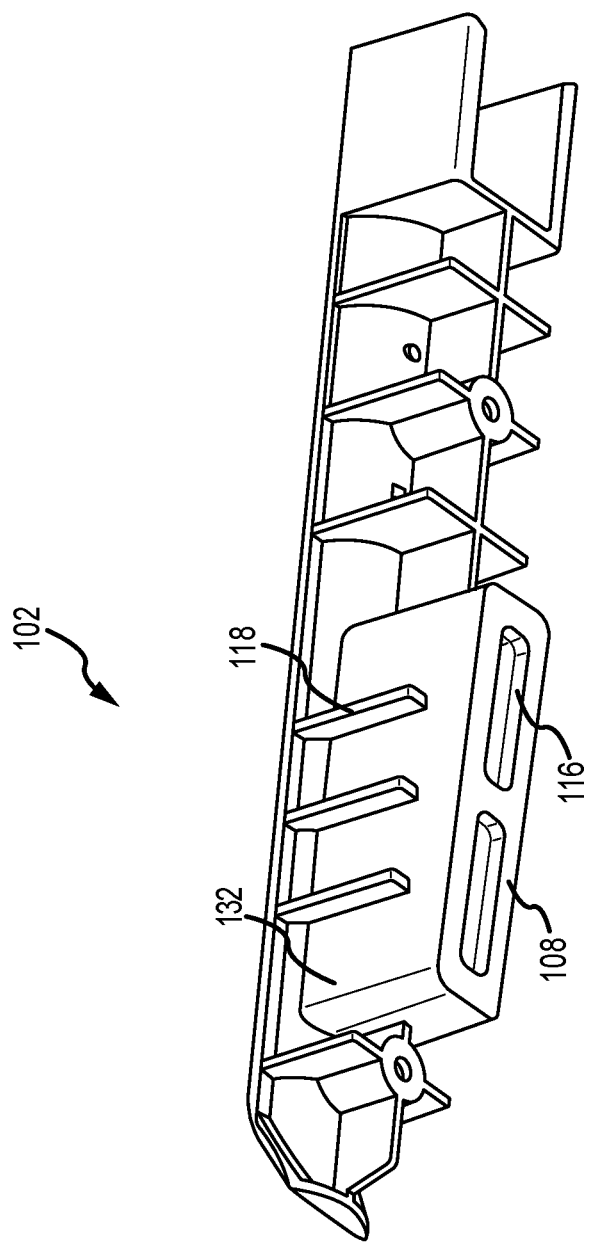
FIG. 4 is a bottom perspective view of the firearm barrel tray illustrated in FIG. 1.

FIG. 4 shows a bottom perspective of the tray 102. The accessory interface 108, which may be located on a second side (e.g., an underside) of the stock 104 may include one or more elongated slots 116. The accessory interface 108 may include a modular locking accessory mounting system for hard mounting one or more accessories to a negative space mounting point. The accessory interface 108 may include one or more slots compatible with the Magpul M-LOK® system, for example. The material surrounding the elongated slots 116, being of high-strength, rigid, durable material, provides the advantage of being resistant to deformation or damage when engaged with a modular locking accessory mounting system. Though not shown, in some embodiments, the elongated slots may be located on a different portion of the tray 102, such as on the side, and may exist in place of or in addition to the slots on the bottom of the stock. In such embodiments, the stock 104 may have corresponding recesses that allow the elongated slots to be accessible from the sides.

Figure 12:
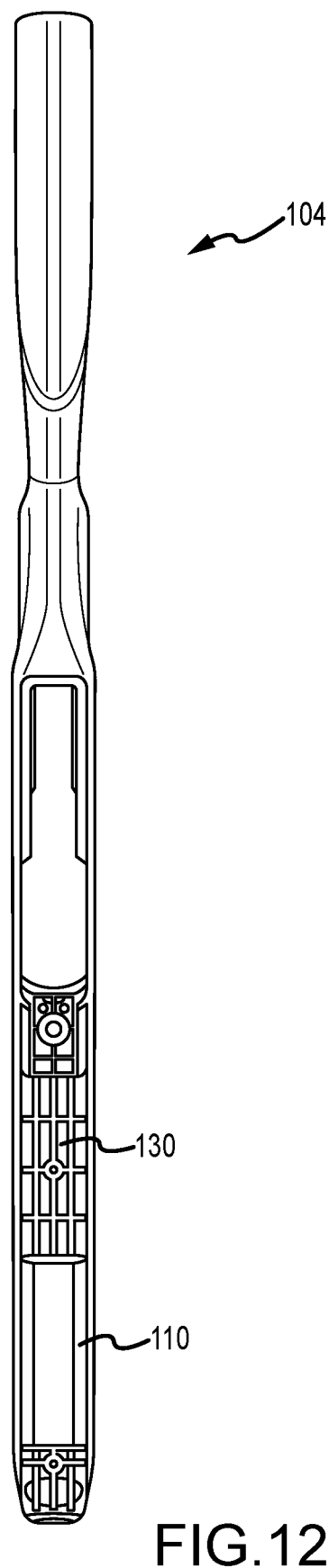
FIG. 12 is a top view of the stock in FIG. 1 alone.

The tray 102 may include one or more reinforcing ribs 118 on a supporting wall 132 as illustrated in FIG. 4. The supporting wall 132, as shown, connects the barrel channel 106 to the accessory mounting interface 108. Similarly, the stock 104 may include one or more reinforcing ribs 130, as illustrated in FIG. 12. The reinforcing ribs 118, 120 may be positioned so as to minimize a tendency of the tray 102 and/or stock 104 to rotate or bend relative to a longitudinal axis, such as a longitudinal axis defined by a firing direction.

Figure 5:
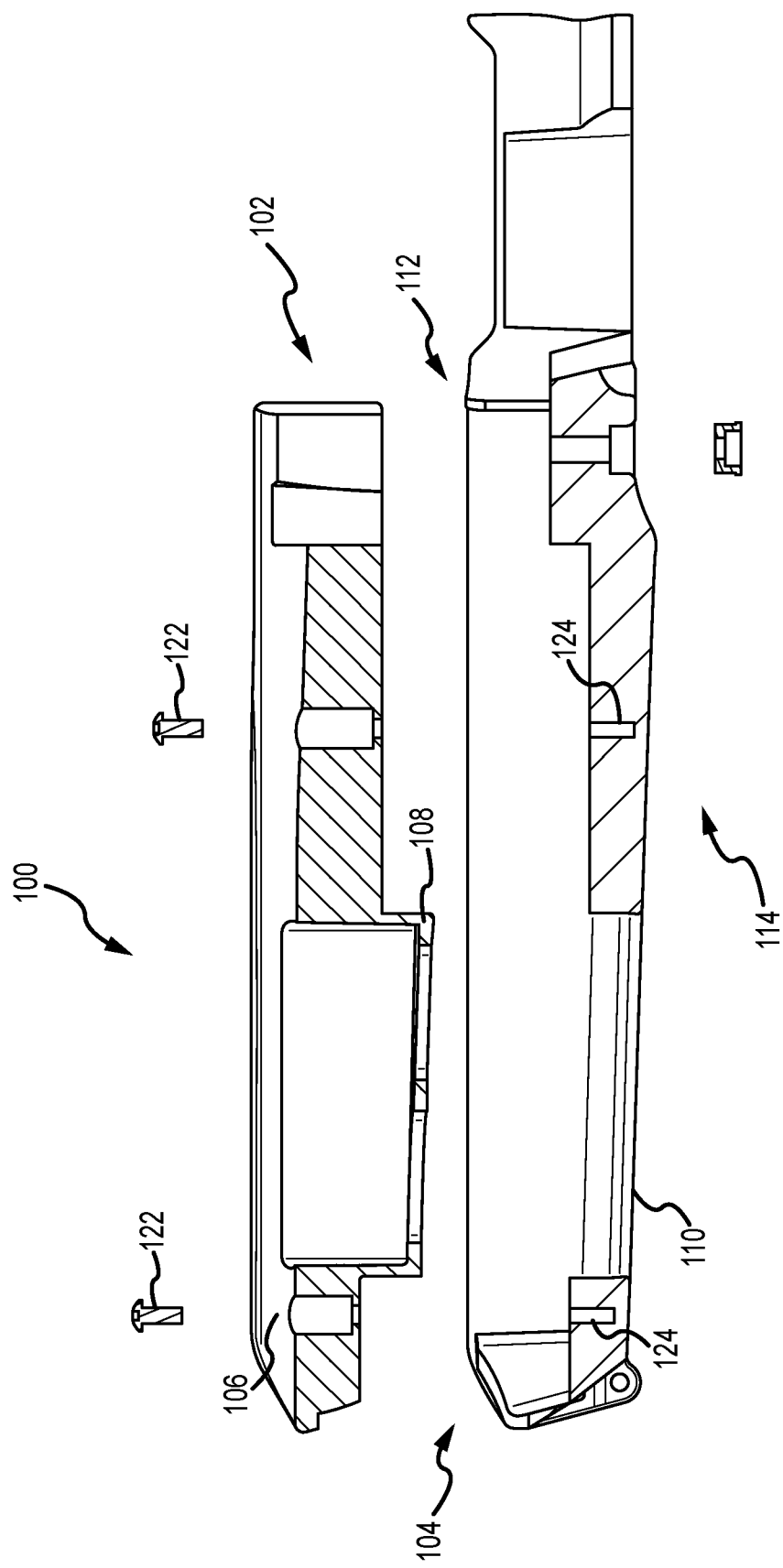
FIG. 5 is an exploded side section view of the firearm barrel tray and a forend portion of the stock in FIG. 1.

As illustrated most clearly in FIG. 5, the system 100 may include one or more fasteners 122 for removably attaching the tray 102 to the stock 104. The fasteners 122 may be inserted on a first side 112 of the stock 104. The fasteners 122 may be threaded, and may pass through the tray 102 for engagement with one or more threaded recesses 124 in the stock 104. A threaded screw fastener may provide the advantage of creating an extremely secure connection between the tray 102 and stock 104, which may be manufactured as separate pieces because they are different materials. However, in some embodiments, other fasteners or attachment mechanisms may be implemented. For example, the stock 104 may be configured to receive the tray 104 such that it snaps into place through pressure.

The tray 102 may be attached to the stock 104 in a position wherein a majority of the tray 102 is positioned on a first side 112 of the stock 102 and an accessory interface 108 extends at least partially through a recess 110 in the stock 104 such that the accessory interface 108 is accessible from a second side 114 of the stock 104. By the phrase "positioned on," it is to be understood that the terms "nested" or "seated into" would also be appropriate synonyms for the purpose of this disclosure.

In some embodiments, the barrel channel 106 is adapted to support a tapered barrel, meaning that a front portion of the barrel channel 106 would be narrower than a back portion of the barrel channel 106. In some embodiments, the barrel channel 106 is adapted to support a straight or bull barrel, meaning that the length of the barrel channel 106 that interfaces with the barrel has a uniform width. The tray 102 and stock 104 may be configured for particular popular models of firearms having receivers and barrels of a particular size. Such firearms may come with standard stocks which may be easily replaced with the tray 102 and stock 104 system of the present disclosure.

Figure 6:
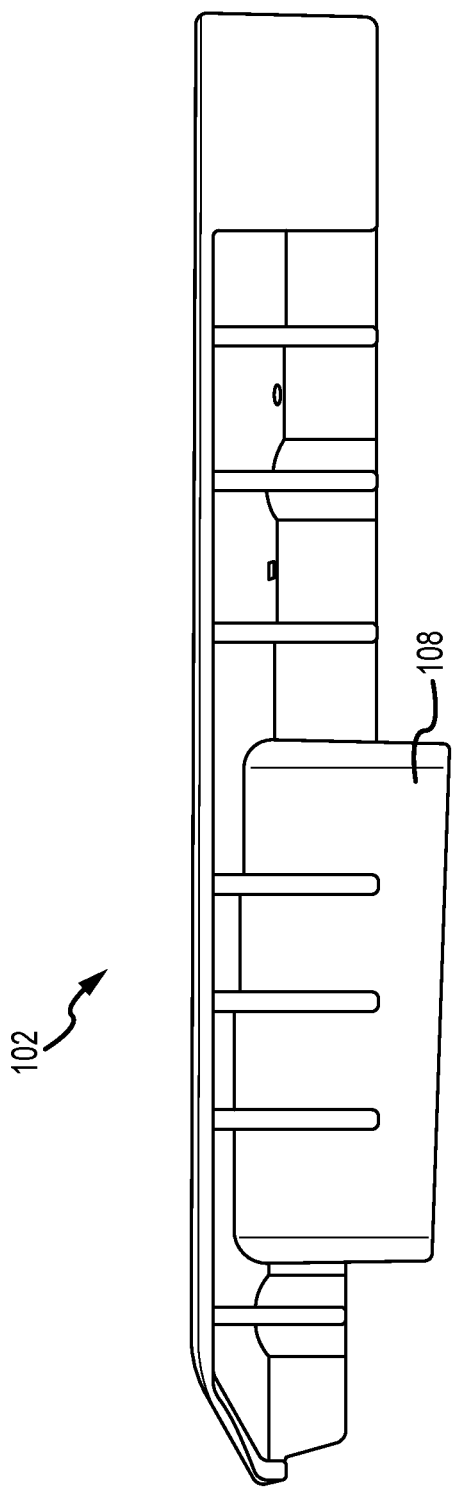
FIG. 6 is a first side view of the tray in FIG. 1.
Figure 7:
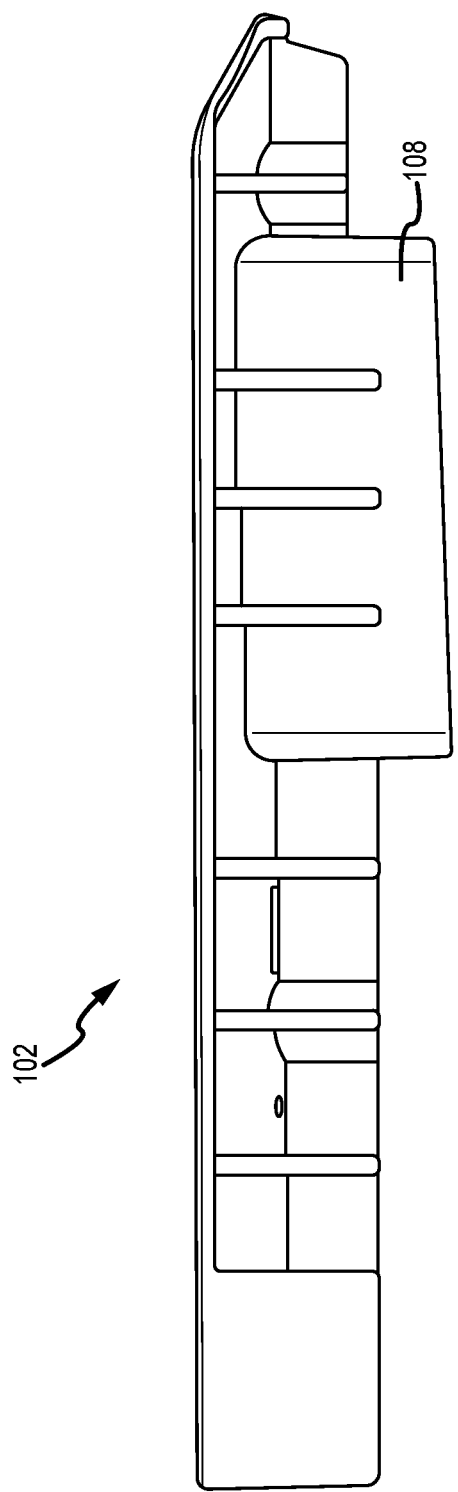
FIG. 7 is a second side view of the tray in FIG. 1.

FIGS. 6 and 7 show left and right side views, respectively, of the tray 102. As shown, the reinforcing ribs 118, 120 may be visible and stick out from an outer portion of the tray 102, and may interface with corresponding grooves in the stock 104. The tolerance of the interface between the ribs 118, 120 and the grooves may be configured to limit any movement between the tray 102 and the stock 104.

Figure 8:
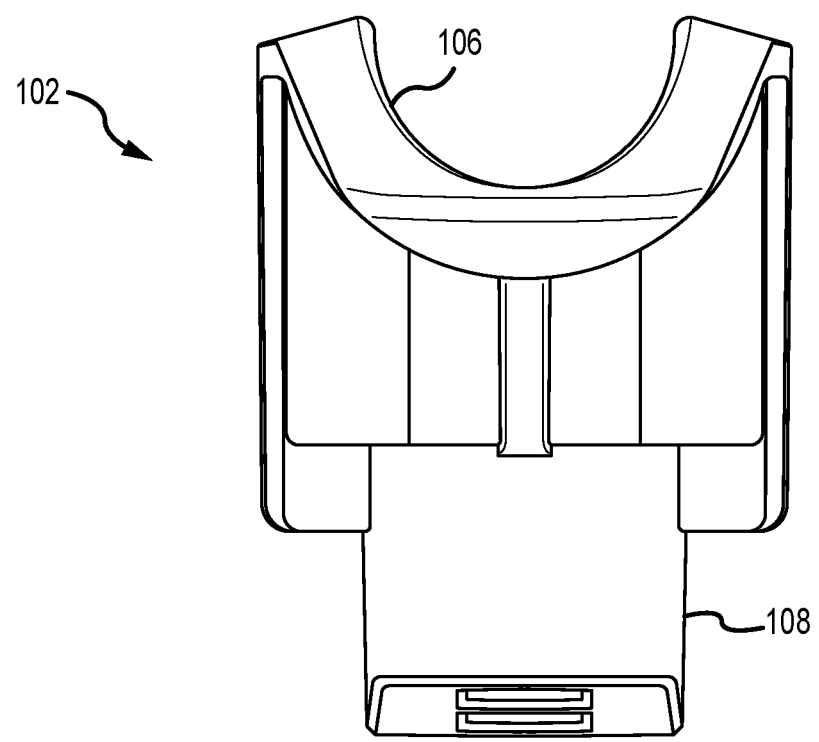
FIG. 8 is a front or distal end view of the tray in FIG. 1.
Figure 9:
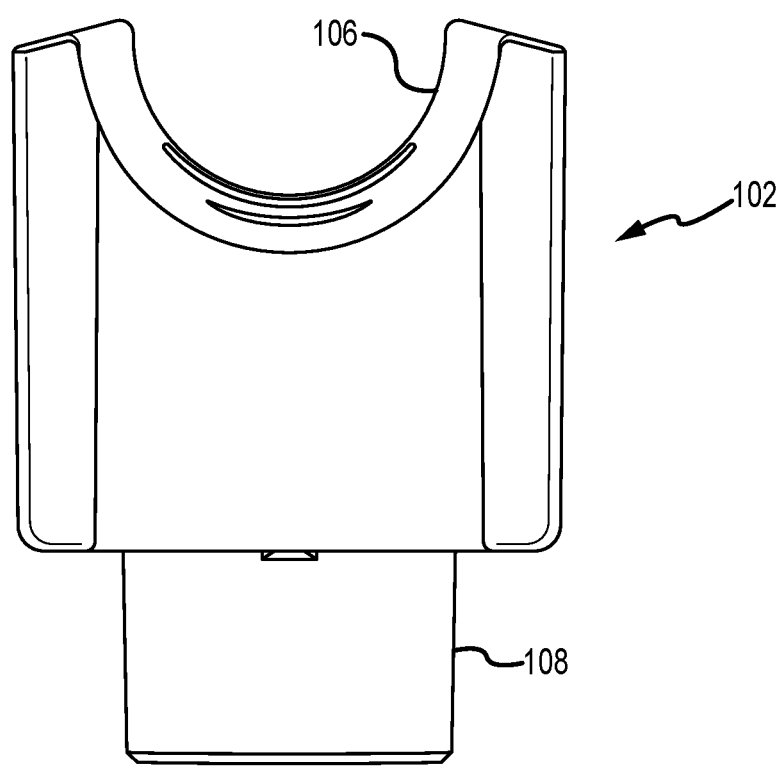
FIG. 9 is a back or proximal end view of the tray in FIG. 1.

FIG. 8 shows a front or distal view of the tray 102. As shown, the barrel channel 106 forms a half-circle shape to cradle the barrel. The barrel channel 106 may be configured in this fashion in part to limit the movement of the barrel and keep it supported while leaving the top exposed for heat dissipation. The accessory interface portion 108 of the tray is narrower than the width of the barrel channel 106 and the portion with the reinforcing ribs 118, 120. Such a configuration allows the accessory interface portion 108 to nest within an opening within the stock 102. FIG. 9 shows a back view of the tray 102. As previously described, the tray 102 may be configured to receive a tapered or straight barrel. The embodiment shown depicts a barrel channel 106 in FIGS. 8 and 9 having a shape wherein the front of the barrel channel is narrower than the back, which indicates this embodiment is configured for a tapered barrel.

Figure 10:
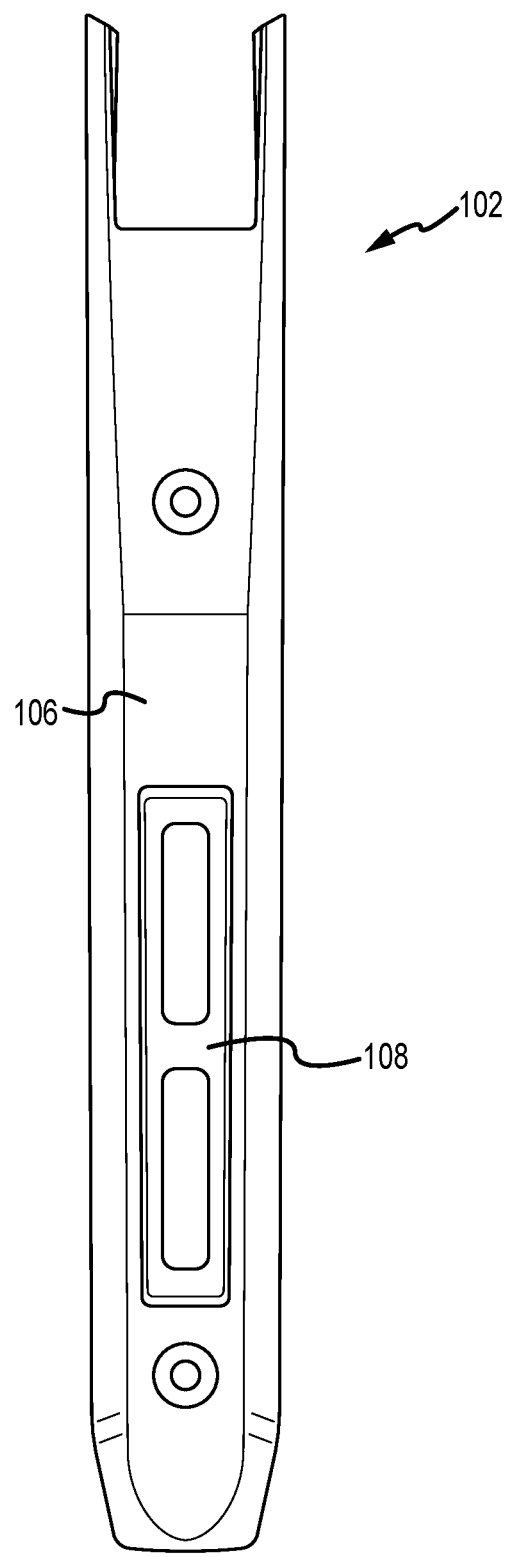
FIG. 10 is a top view of the tray in FIG. 1.
Figure 11:
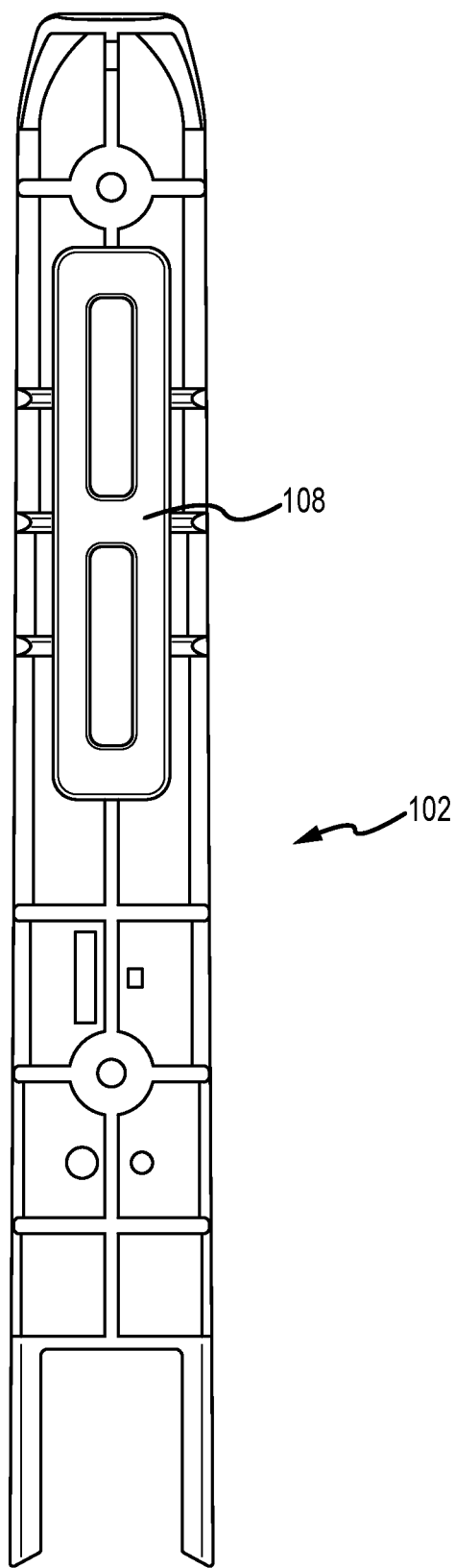
FIG. 11 is a bottom view of the tray in FIG. 1.

FIG. 10 shows a top view of the barrel tray 102 alone. As shown, the slots of the attachment mechanism 108 are visible from the top of the stock. FIG. 11 shows a bottom view of the tray 102. Though not shown, the attachment mechanism 108 may be substantially flush with a bottom surface profile of the stock 104.

Figure 13:
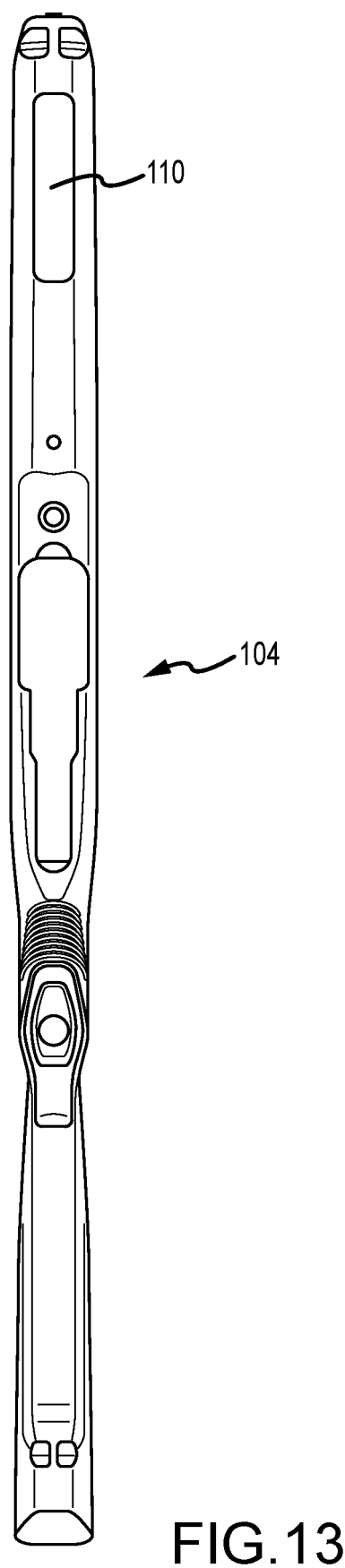
FIG. 13 is a bottom view of the stock in FIG. 1 alone.

FIG. 12 shows the entirety of the stock 104 alone (i.e., without the tray). In embodiments, the entirety of the stock 104 as shown may be made from a lower weight, lower cost, and/or lower durability material than the tray. This stock material may also have higher flexibility and lower rigidity than the tray material. The stock may include stock reinforcing ribs 130 that provide strength while minimizing weight in comparison to either a solid or hollow construction. The recess 110 through which the attachment mechanism 108 may be inserted is shown in FIG. 12 and also in FIG. 13, which shows a view from a bottom side of the stock. Turning back to FIG. 12, the attachment points for the tray 102 via the fasteners are shown located on distal 128 and proximal 132 ends of the recess 110 respectively, which allows the attachment mechanism to fill the recess 110, which comprises a majority of the width of the stock.

Figure 14:
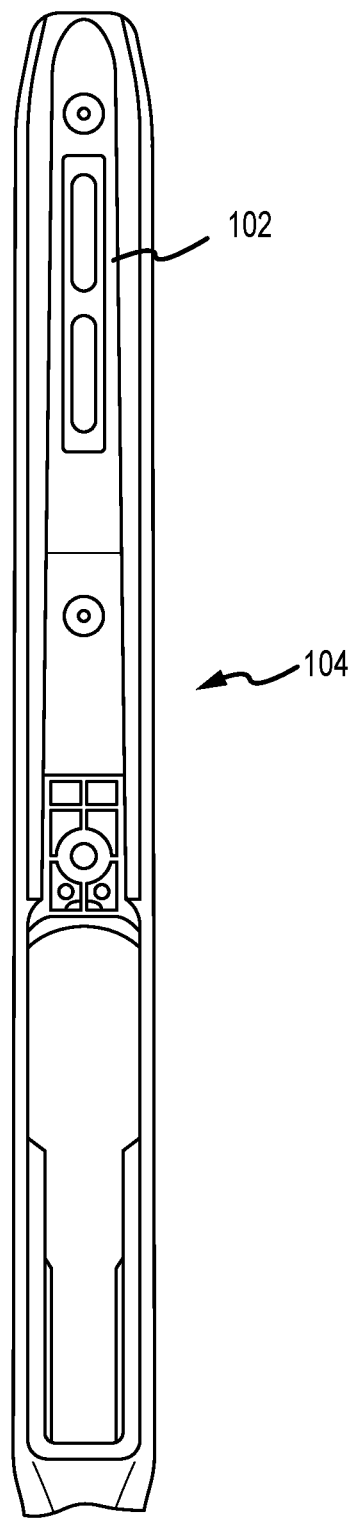
FIG. 14 is a top view of the stock and tray in FIG. 1.
Figure 15:
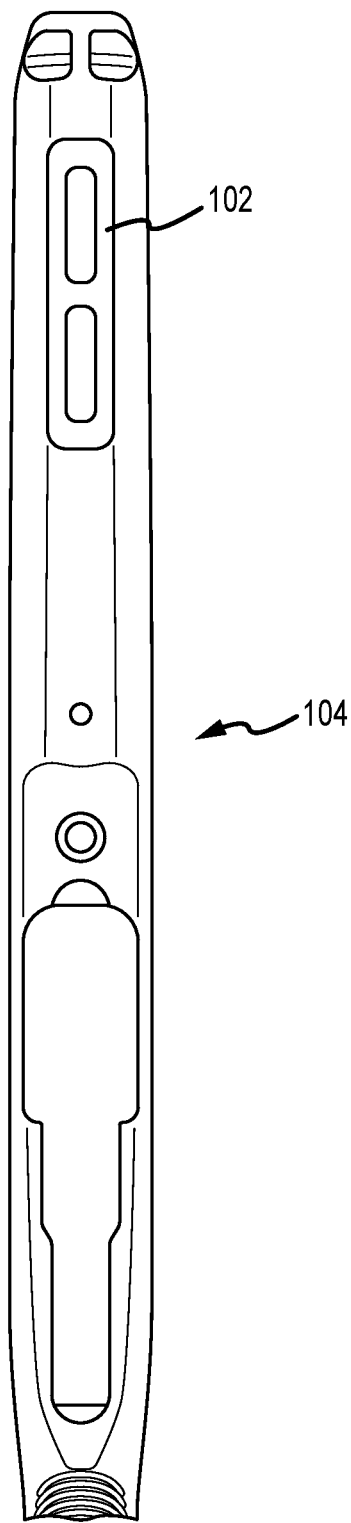
FIG. 15 is a bottom view of the stock and tray in FIG. 1.

FIG. 14 shows a top view of the stock 104 and tray 102 fully assembled, and FIG. 15 shows a bottom view of the same.

Figure 16:
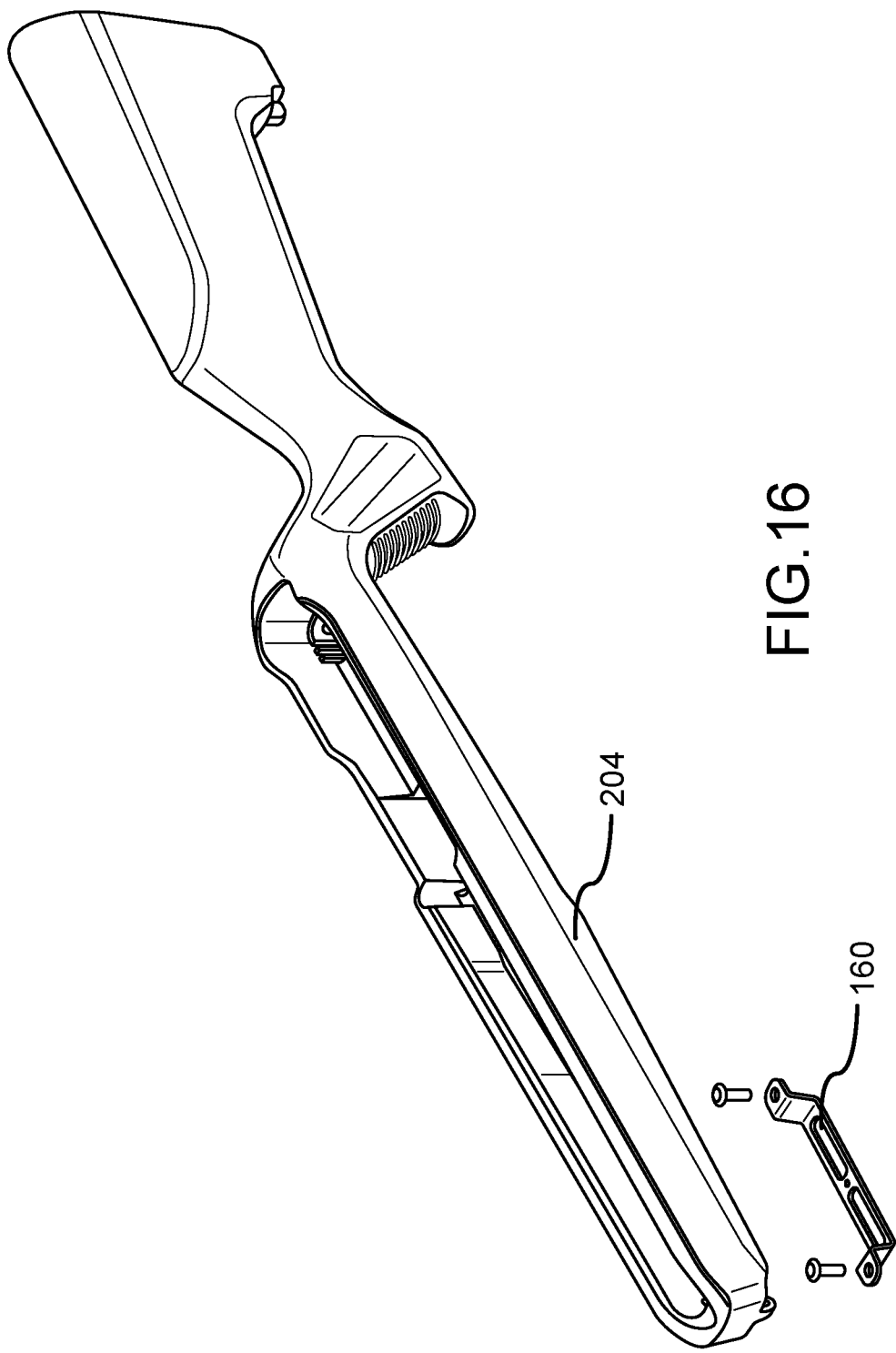
FIG. 16 is an exploded, perspective view of a different embodiment of a stock and attachment mechanism component of the present disclosure.

FIG. 16 shows another embodiment of a stock and attachment mechanism assembly of the present disclosure. In this embodiment, the stock 204 may be configured to interface solely with an attachment bracket 160 rather than a barrel tray with an attachment mechanism. In this example, the stock 204 may not be configured to interface with a separate barrel tray, but may itself support a barrel (e.g., tapered or straight) by its shape. The attachment bracket 160 may be made from any high-strength polymer, composite, or metal, and may have accessory slots that are compatible with modular locking accessory attachment systems. These accessory slots may be identical to the accessory slots of the attachment mechanism 108 of the tray 102 in the embodiment shown in FIGS. 1-13. The design of the stock 204 may further minimize weight and manufacturing costs.

Figure 17:
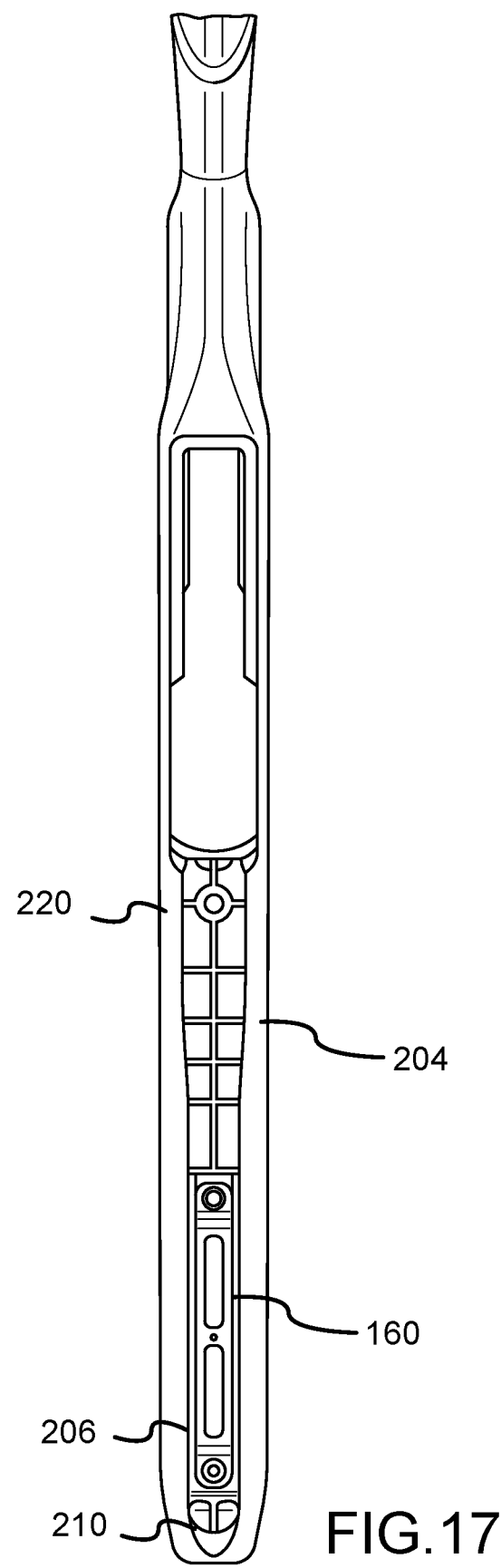
FIG. 17 is a top view of the stock in FIG. 14.
Figure 18:
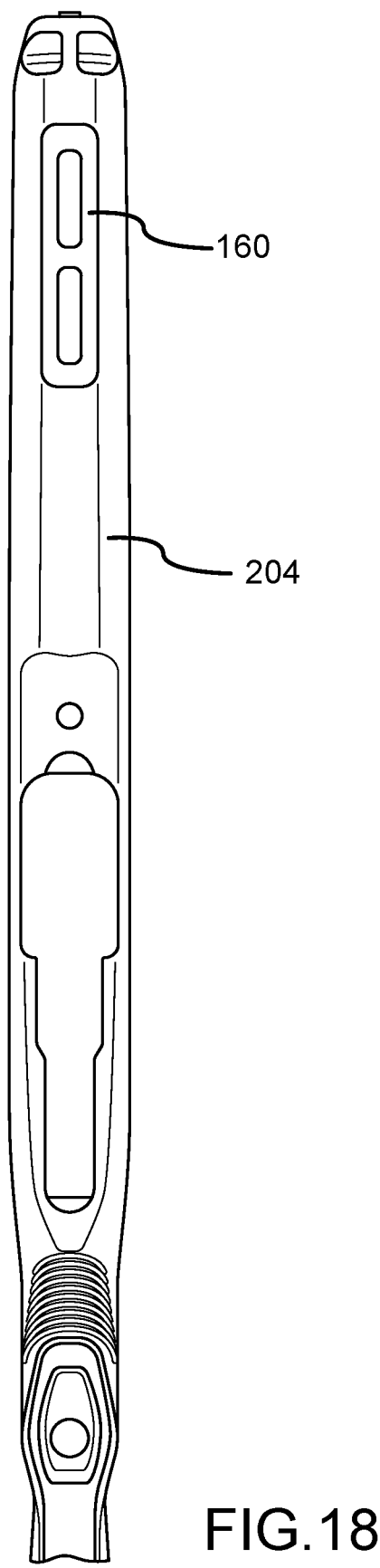
FIG. 18 is a bottom view of the stock in FIG. 14.

FIG. 17 shows a top view of the stock 204 with the attachment bracket 160 fastened in place. The attachment bracket 160 may be fastened via threaded fasteners directly to an inside portion of the stock 204. The embodiment of the stock 204 shown accommodates a tapered barrel, with a distal end 210 of the barrel channel 206 being slightly narrower than a proximal end 220. FIG. 18 shows the stock 204 and attachment bracket 160 from a bottom side, which illustrated that the bracket 160 is substantially flush with a bottom profile of the stock 204.

Figure 19:
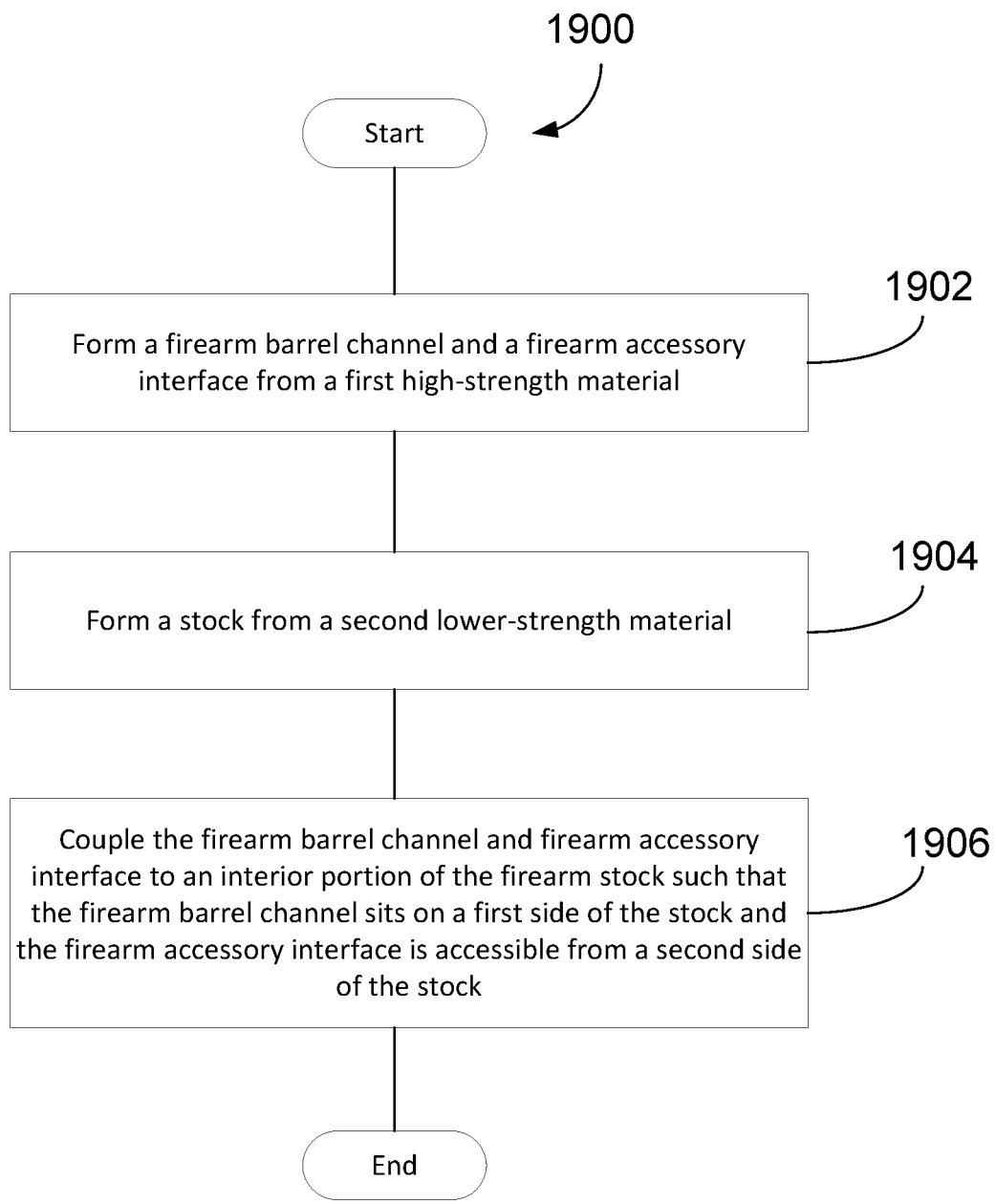
FIG. 19 is a flowchart of a method of making a firearm stock system.

Turning now to FIG. 19, a method 1900 of making a firearm support system is now described. The method 1900 may include forming 1902 a firearm barrel channel and a firearm accessory interface from a first high-strength material. Forming 1902 may be achieved by forming an as previously described and illustrated herein. Forming 1902 may include forming of a high-strength engineering grade polymer and/or reinforced composite materials.

The method 1900 may include forming 1904 a firearm stock from a second lower-strength material. Forming 1904 may be achieved by forming a stock as previously described and illustrated herein. Forming 1904 may include forming of a lower cost engineering polymer or a commodity plastic. Forming 1904 may include forming of a material that is not as strong as a material used to form the firearm barrel channel and firearm accessory mounting interface. The method 1900 may further include coupling 1906 the firearm barrel channel and firearm accessory interface to an interior portion of the firearm stock such that the firearm barrel channel sits on a top side of the stock and the firearm accessory interface is accessible from a bottom side of the stock The terms and expressions employed herein are used as terms and expressions of description and not of limitation, and there is no intention, in the use of such terms and expressions, of excluding any equivalents of the features shown and described or portions thereof. In addition, having described certain embodiments, it will be apparent to those of ordinary skill in the art that other embodiments incorporating the concepts disclosed herein may be used without departing from the spirit and scope of the disclosure. Accordingly, the described embodiments are to be considered in all respects as only illustrative and not restrictive.

Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this disclosure is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a fastener should be understood to encompass disclosure of the act of fastening—whether explicitly discussed or not—and, conversely, were there only disclosure of the act of fastening, such a disclosure should be understood to encompass disclosure of a fastening mechanism. Such changes and alternative terms are to be understood to be explicitly included in the description.

The previous description of the disclosed embodiments and examples is provided to enable any person skilled in the art to make or use the present disclosure as defined by the claims. Thus, the present disclosure is not intended to be limited to the examples disclosed herein. Various modifications to these embodiments will be readily apparent to those skilled in the art, and the generic principles defined herein may be applied to other embodiments without departing from the spirit or scope of the invention as claimed.

What is claimed is:

1. A firearm barrel tray having a barrel channel and a firearm accessory mounting interface, wherein the firearm barrel tray is configured to be attached to a firearm stock such that the barrel channel sits on a first side of the firearm stock and the firearm accessory mounting interface is configured to align with an elongated recess on a second side of the firearm stock, the accessory mounting interface comprising one or more elongated accessory mounting interface slots configured to receive a locking component of an accessory.

2. The firearm barrel tray of claim 1, wherein the firearm barrel tray is made of a higher-strength material than a material from which the firearm stock is formed.

3. The firearm barrel tray of claim 1, wherein the firearm barrel tray is configured to be fastened to the firearm stock via fasteners that threadingly engage the firearm stock.

4. The firearm barrel tray of claim 1, wherein the barrel channel is configured to support a tapered barrel.

5. The firearm barrel tray of claim 1, wherein the accessory mounting interface is substantially flush with a profile of the stock.

6. A system having a firearm stock and a barrel tray removably coupled to the firearm stock, the barrel tray having a barrel channel positioned on a first side of the firearm stock and a firearm accessory interface including one or more elongated accessory mounting interface slots aligned with an elongated recess on a second side of the firearm stock and being unitary with or directly coupled to the barrel channel, wherein the one or more elongated accessory mounting interface slots are accessible from the second side of the stock, the second side opposing the first side, and wherein the barrel tray is made of a stronger material than a material from which the firearm stock is made, the one or more elongated accessory mounting interface slots configured to receive a locking component of an accessory.

7. The system of claim 6, wherein the barrel tray is made from high-strength engineering grade polymer and/or reinforced composite materials and the stock is made from lower-cost engineering polymer or a commodity plastic.

8. The system of claim 6, wherein the barrel tray is configured to be fastened to an interior portion of the firearm stock via one or more threaded fasteners.

9. A system comprising a firearm stock and an accessory mounting interface, wherein:
the accessory mounting interface comprises one or more elongated slots and a barrel tray having a barrel channel and is removably coupled to an interior portion of the firearm stock through a first side of the firearm stock and the one or more elongated slots are accessible through a second side of the firearm stock and are each configured to receive a locking component of an accessory; and wherein
the accessory mounting interface is made from a stronger material than a material from which the firearm stock is made.

10. The system of claim 9, wherein the firearm stock is configured to support a barrel on a top portion of the firearm stock.

11. The system of claim 9, wherein the accessory mounting interface is configured to be attached to and in contact with only a bottom portion of the firearm stock.

12. The system of claim 9, wherein the accessory mounting interface is made of metal.

13. The system of claim 9, wherein the accessory mounting interface is substantially flush with a profile of the firearm stock.

14. The system of claim 9, wherein the accessory mounting interface aligns with a recess in the second side of the firearm stock.

* * * * *